US011912354B2

(12) United States Patent
Jones (10) Patent No.: US 11,912,354 B2
(45) Date of Patent: Feb. 27, 2024

(54) REDUCED MATERIAL HYDRAULIC MINING SHOVEL TRACK PAD

(71) Applicant: Caterpillar Inc., Peoria, IL (US)

(72) Inventor: Benjamin Isaac Jones, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 582 days.

(21) Appl. No.: 17/085,294

(22) Filed: Oct. 30, 2020

(65) Prior Publication Data
US 2022/0135157 A1   May 5, 2022

(51) Int. Cl.
*B62D 55/26*   (2006.01)
*B62D 55/21*   (2006.01)

(52) U.S. Cl.
CPC ............. *B62D 55/26* (2013.01); *B62D 55/21* (2013.01)

(58) Field of Classification Search
CPC ......... B62D 55/21; B62D 55/26; B62D 55/20
See application file for complete search history.

(56) References Cited

U.S. PATENT DOCUMENTS

| | | | | | |
|---|---|---|---|---|---|
| 1,759,049 | A | * | 5/1930 | Fykse | B62D 55/26 305/113 |
| 1,947,883 | A | * | 2/1934 | Snyder | B62D 55/20 305/200 |
| 2,167,039 | A | * | 7/1939 | Ekbom | B62D 55/20 305/111 |
| 2,452,921 | A | * | 11/1948 | Gillespie | B62D 55/125 305/53 |
| 4,176,887 | A | * | 12/1979 | Alpers | B62D 55/15 305/202 |
| 4,425,007 | A | * | 1/1984 | Soeteber | B62D 55/26 474/901 |
| 6,543,863 | B1 | * | 4/2003 | Hannan | B62D 55/26 305/201 |
| 9,409,613 | B2 | | 8/2016 | Hakes | |
| 2015/0158536 | A1 | * | 6/2015 | Takagi | B62D 55/12 305/201 |
| 2018/0319446 | A1 | | 11/2018 | Acosto et al. | |
| 2018/0319448 | A1 | | 11/2018 | Acosta et al. | |
| 2019/0283818 | A1 | | 9/2019 | Jones, Jr. | |

(Continued)

FOREIGN PATENT DOCUMENTS

| | | |
|---|---|---|
| CA | 3092563 | 9/2019 |
| CN | 2143191 Y | 10/1993 |
| CN | 202413978 U | 9/2012 |

(Continued)

OTHER PUBLICATIONS

Machine Translation of CN 109927804 A, 7 pages (Year: 2019).*

*Primary Examiner* — S. Joseph Morano
*Assistant Examiner* — Emily G. Castonguay (57) ABSTRACT

Track pad includes a first link member that extends upwardly from the shoe member including a first lug member extending from the first link member in a first direction, as well as a second lug member and a third lug member both extending from the first link member in a second direction opposite of the first direction. The track pad also defines a first side cavity that extends from the first lateral end toward the second lateral end, jogging from the front end toward the rear end along the track chain traveling direction, and downwardly toward the ground engaging surface.

20 Claims, 7 Drawing Sheets

(56) References Cited

U.S. PATENT DOCUMENTS

2019/0329831 A1   10/2019  Restifo
2019/0351958 A1   11/2019  Hakes et al.

FOREIGN PATENT DOCUMENTS

| CN | 206086951 U | | 4/2017 | |
| CN | 109927804 A | * | 6/2019 | ............ B62D 55/26 |
| KR | 101568729 B1 | | 11/2015 | |

* cited by examiner

REDUCED MATERIAL HYDRAULIC MINING SHOVEL TRACK PAD

TECHNICAL FIELD

The present disclosure relates to track pads that are used to support heavy equipment such as hydraulic mining shovels, and the like. Specifically, the present disclosure relates to such track pads that are manufactured requiring less material without comprising the integrity of the track pad.

BACKGROUND

In various mining applications, the track pad is subject to heavy loads, requiring that the track pad be robust. However, the amount of material needed to create such track pads increases the cost and may necessitate thick sections that are difficult to manufacture without problems occurring such as voids, porosity, etc. This may lead to unwanted maintenance of the track pad early on its useful life at a higher cost than desired.

U.S. Pat. Appl. Publ. No. 20190351958 A1 discloses a multi-material track pad for a continuous track assembly. The track pad may include a body with a ground-engaging surface, wherein the body is formed of a metal material with a first hardness, as well as a roller-engaging surface, wherein the roller-engaging surface if formed of a ceramic material with a second hardness that is greater than the first hardness, and a sprocket-engaging surface formed of the ceramic material.

However, this prior art fails to disclose a track pad that avoids costly manufacture, and reduces the likelihood of manufacturing problems such as voids, and porosity, etc.

SUMMARY

A track pad according to an embodiment of the present disclosure may comprise a shoe member including a ground engaging surface, and defining a track chain traveling direction, a lateral direction perpendicular to the track chain traveling direction, and a vertical direction perpendicular to both the lateral direction, and the track chain traveling direction. The shoe member may further define a first lateral end, a second lateral end, a front end along the track chain traveling direction, and a rear end along the track chain traveling direction, a lateral distance from the first lateral end to the second lateral end, and a width from the front end to the rear end along the track chain traveling direction that is greater than the lateral distance. A first link member may extend upwardly from the shoe member including a first lug member extending from the first link member in a first direction parallel to the track chain traveling direction, as well as a second lug member and a third lug member both extending from the first link member in a second direction opposite of the first direction. The track pad may define a first side cavity that extends from the first lateral end toward the second lateral end, jogging both from the front end toward the rear end along the track chain traveling direction, and downwardly toward the ground engaging surface.

A track pad according to another embodiment of the present disclosure may comprise a shoe member including a ground engaging surface, and defining a track chain traveling direction, a lateral direction perpendicular to the track chain traveling direction, and a vertical direction perpendicular to both the lateral direction, and the track chain traveling direction. The shoe member may further define a first lateral end, a second lateral end, a front end along the track chain traveling direction, and a rear end along the track chain traveling direction, a lateral distance from the first lateral end to the second lateral end, and a length from the front end to the rear end along the track chain traveling direction that is greater than the lateral distance. A first link member may extend upwardly from the shoe member including a first top rail surface (e.g. may be planar), a first lug member extending from the first link member in a first direction parallel to the track chain traveling direction, and a second lug member and a third lug member both extending from the first link member in a second direction opposite of the first direction. A second link member may extend upwardly from the shoe member including a second top rail surface, a fourth lug member extending from the link member along the first direction parallel to the track chain traveling direction, a fifth lug member and a sixth lug member both extending from the second link member in the second direction opposite of the first direction. The track pad may define a first side cavity that extends from the first lateral end toward the second lateral end underneath the first top rail surface, a second side cavity that extends from the second lateral end toward the first lateral end underneath the second top rail surface, a bottom void that extends upwardly from the ground engaging surface, and a upper slot disposed vertically above the bottom void, forming a "H" cross-section in a plane that is perpendicular to the track chain traveling direction.

A track pad according to yet another embodiment of the present disclosure may comprise a shoe member including a ground engaging surface, and defining a track chain traveling direction, a lateral direction perpendicular to the track chain traveling direction, and a vertical direction perpendicular to both the lateral direction, and the track chain traveling direction. The shoe member may further define a first lateral end, a second lateral end, a front end along the track chain traveling direction, and a rear end along the track chain traveling direction, a lateral distance from the first lateral end to the second lateral end, and a length from the front end to the rear end along the track chain traveling direction that is greater than the lateral distance. A first link member may extend upwardly from the shoe member including a first lug member extending from the first link member in a first direction parallel to the track chain traveling direction, and a second lug member and a third lug member both extending from the first link member in a second direction opposite of the first direction. The first lug member and the second lug member may define a first top rail surface. Also, the track pad may define a first side cavity that extends from the first lateral end toward the second lateral end underneath the first top rail surface, jogging both from the front end toward the rear end along the track chain traveling direction, and downwardly toward the ground engaging surface. A first rib may extend from the first lateral end to the first link member, and a second rib may extend from the first lateral end to the first link member, bounding on either side the first side cavity. A first blend may transition from the shoe member to the first rib, and a second blend may transition from the shoe member to the second rib. Moreover, the ground engaging surface may define a bottom void that is spaced laterally away from the first side cavity, forming a support column therebetween. This support column may also at least partially be positioned underneath the first top rail surface. The ground engaging surface may further define a first bottom lateral void that extends laterally underneath the first side cavity, forming a first wing therebetween that is drafted along the lateral direction. The track pad further defines a first aperture that is disposed between the second lug member and the third lug member below the first top rail surface and above the ground engaging surface, and proximate vertically, laterally, and along the track chain traveling direction to the jogging of the first side cavity.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

While the arrangement is illustrated in connection with a hydraulic mining shovel, the arrangement disclosed herein has universal applicability in various other types of machines commonly employ track systems, as opposed to wheels. The term "machine" may refer to any machine that performs some type of operation associated with an industry such as mining, earthmoving, or construction, or any other industry known in the art. For example, the machine may be an excavator, wheel loader, cable shovel, or dragline or the like. Moreover, one or more implements may be connected to the machine. Such implements may be utilized for a variety of tasks, including, for example, lifting and loading. Among other uses, a hydraulic mining shovel can be used to load overburden and ore into haul trucks during the mining process in various surface mine applications.

Figure 1:
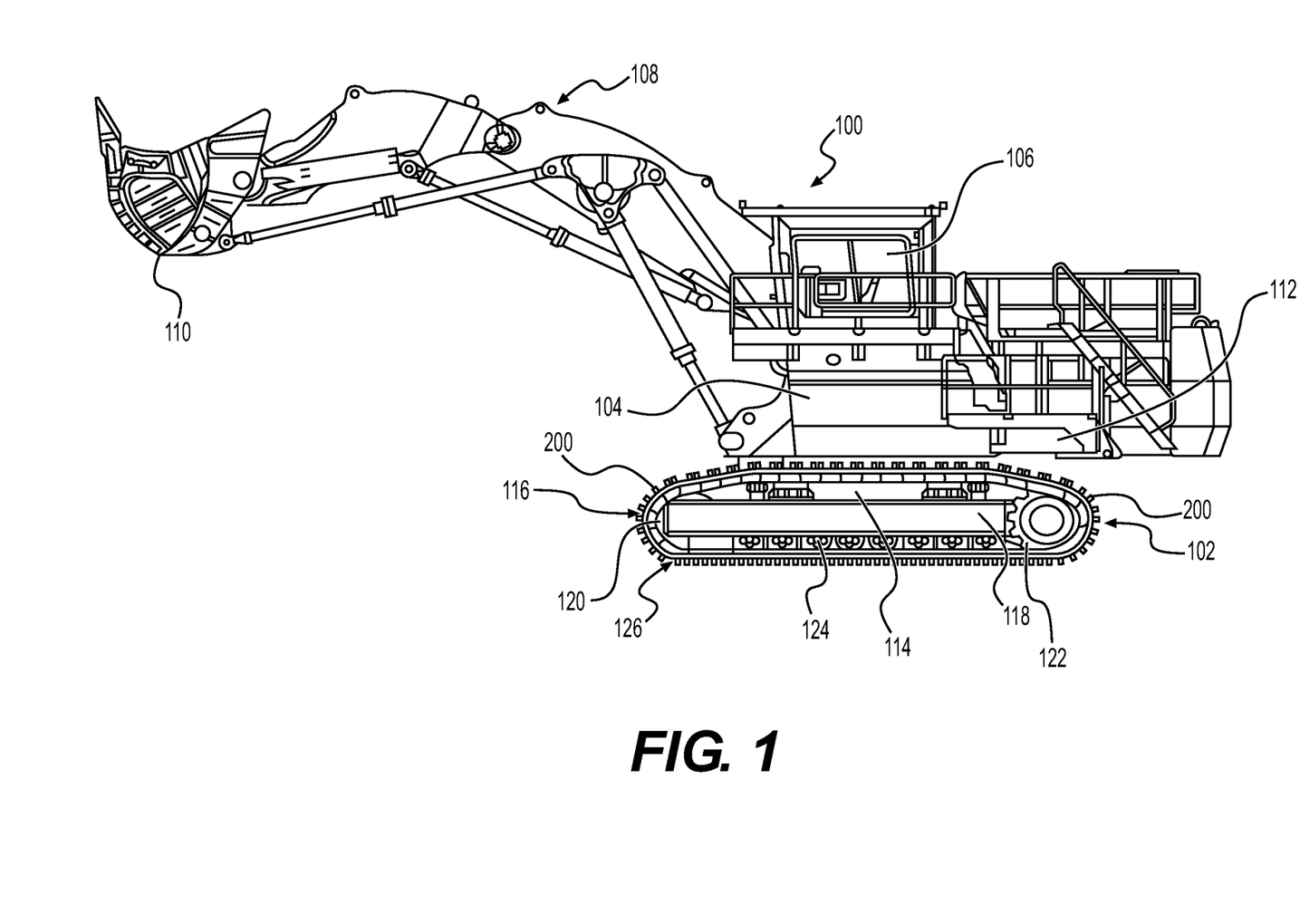
FIG. 1 illustrates a machine in the form of a hydraulic mining shovel that has an undercarriage that may use track chain assemblies having track pads constructed according to the various embodiments disclosed herein.

Looking at FIG. 1, a machine 100 that may use track pads constructed according to various embodiments of the present disclosure can be seen. The machine 100 may include a body 104 with a cab 106 to house a machine operator. The machine may also include a boom system 108 pivotally connected at one end to the body 104 and supporting an implement 110 at an opposing, distal end. In embodiments, the implement 110 can be any suitable implement, such as a bucket, a clamshell, a blade, or any other type of suitable device. A control system can be housed in the cab 106 that can be adapted to allow a machine operator to manipulate and articulate the implement 110 for digging, excavating, or any other suitable application.

The body 104 may be supported on a main frame 112 supported on an undercarriage structure 114. The undercarriage structure 114 includes a supporting structure 118 that supports a track system 102 utilized for movement of the machine 100. The track system 102 may include first and second track roller frame assemblies 116, which are spaced from and adjacent respective first and second sides of the undercarriage structure 114. It will be appreciated that only one of the track roller frame assemblies 116 is visible in FIG. 1.

Each of the track roller frame assemblies 116 carries an idler wheel 120, a drive sprocket wheel 122, and a plurality of track guiding rollers 124. The drive sprocket wheel 122 is powered in forward and reverse directions by the machine 100 (via a motor such as an internal combustion engine). An endless track chain assembly 126 encircles each drive sprocket wheel 122, the idler wheel 120, and the track guiding rollers 124. The track chain assembly 126 includes a plurality of interconnected track pads 200, also referred to as track chain members herein. The track guiding rollers 124 guide the track pads 200 as the track chain assembly 126 is driven by the drive sprocket wheel 122. The track chain assembly 126 may have any track chain member, track pin retention device, and/or track chain assembly.

Figure 2:
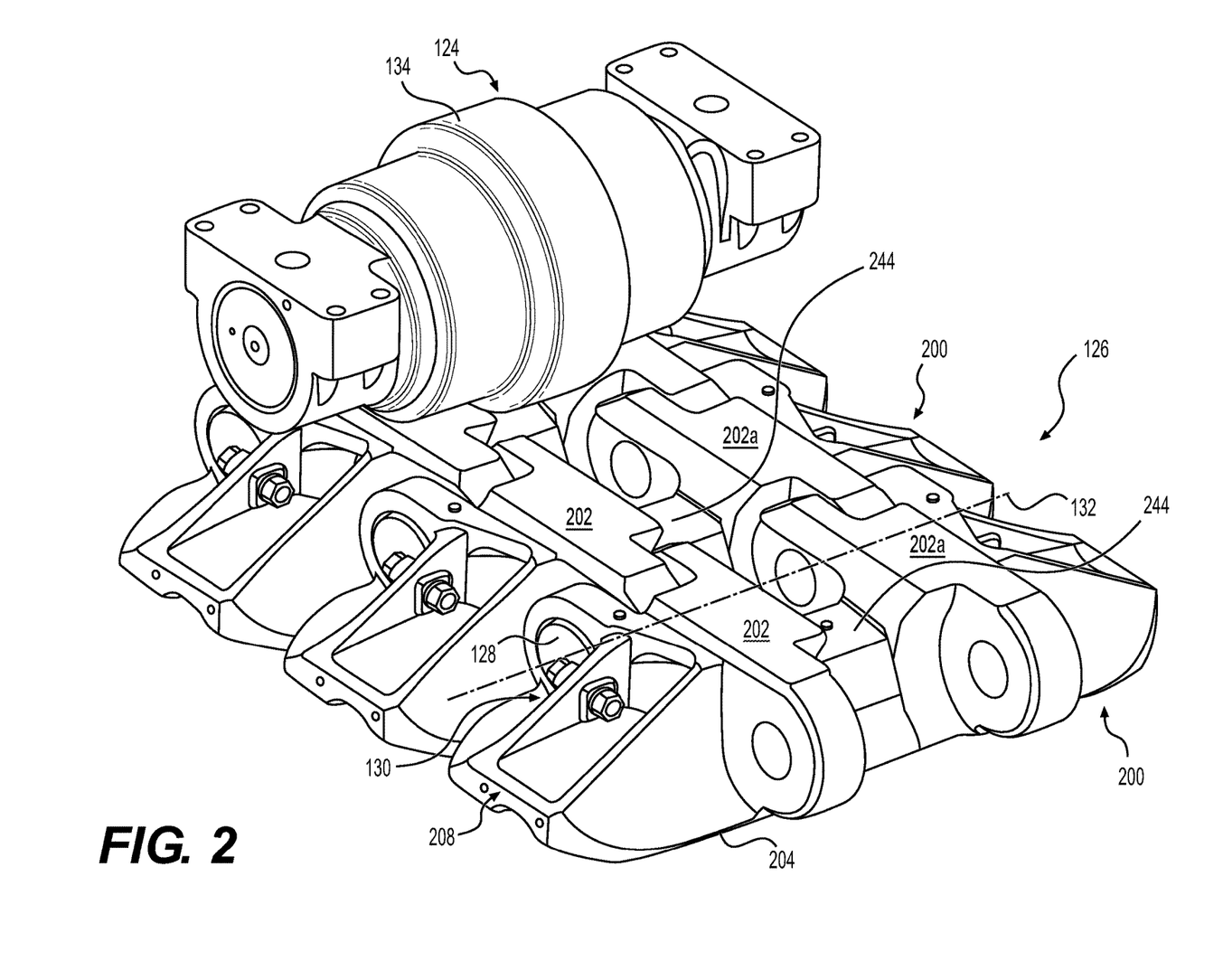
FIG. 2 is a perspective view of a portion of the undercarriage, track chain assembly, and track pads of FIG. 1.

FIG. 2 illustrates a portion of the track chain assembly 126 including two pads 200 that are pivotally connected to each other. A track roller 124 is also shown that rides on the rail surfaces 202 and 202a of the track pads 200. Hence, the weight of the machine 100 is transmitted through the undercarriage structure 114 (see FIG. 1) through the track rollers 124 to the track pad 200, which transmits that load to the ground through its ground engaging surface 204.

Figure 3:
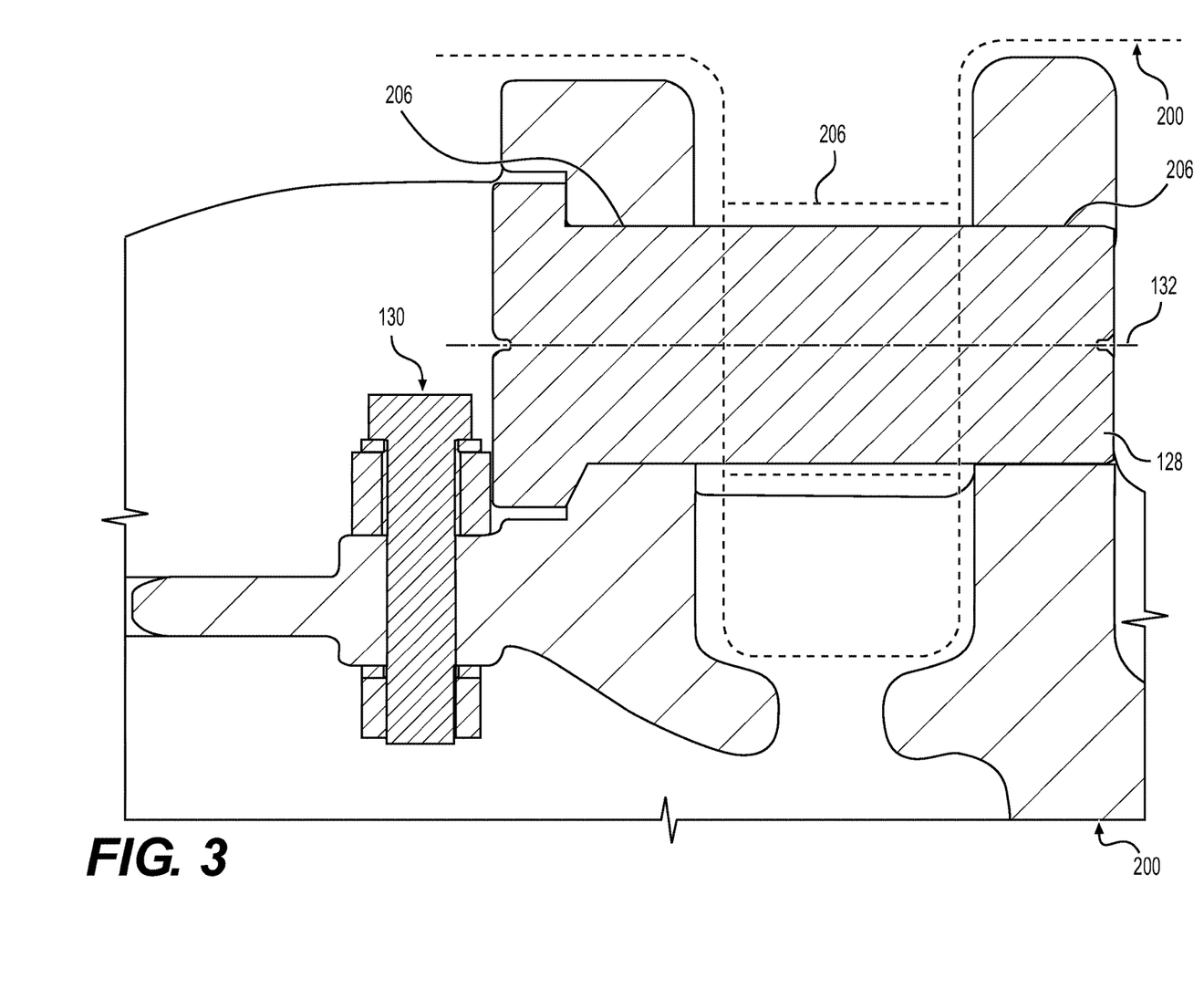
FIG. 3 is a sectional view of the track chain assembly including the two track pads of FIG. 2, depicting a pinned joint that allows the track chain assembly to be flexible since the track pads are free to rotate relative to each other.

FIG. 3 depicts the pinned pivotal connection of a track pad 200 to an adjacent track pad 200, which may be similarly or identically configured as each other. A cartridge pin assembly 128 is shown that is disposed in the bores 206 of the lug members of the link members of the track pads 200 (which will be discussed in more detail momentarily), allowing one track pad 200 to pivot relative to the other. A pin retention bolt assembly 130 that helps to prevent "walking" of the cartridge pin assembly 128 laterally out of the bores is also shown.

Details of various embodiments of the track pad that may be used to construct and/or repair, etc. the track chain assembly will now be discussed in detail with reference to FIGS. 2 thru 8.

Starting with FIGS. 2 and 3, the track pad 200 may comprise a shoe member 208 including a ground engaging surface 204, which defines a track chain traveling direction 210, a lateral direction 212 that is perpendicular to the track chain traveling direction 210, and a vertical direction 214 that is perpendicular to both the lateral direction 212, and the track chain traveling direction 210. The track chain traveling direction 210 is typically perpendicular to the axis of rotation 132 provided by the bores and the cartridge pin assembly 128.

Figure 5:
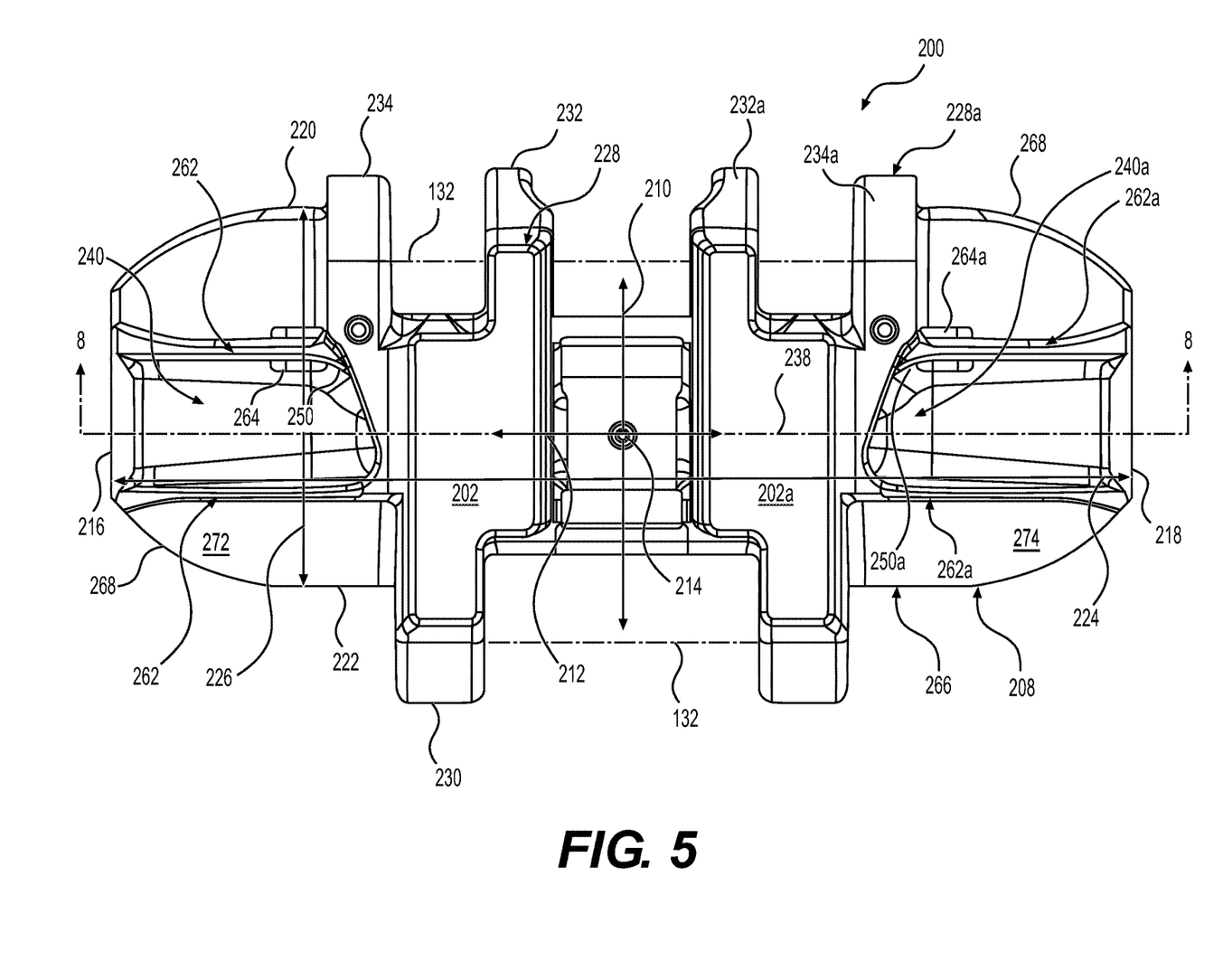
FIG. 5 is a top view of the track pad of FIG. 4.

Turning to FIG. 5, the shoe member 208 (so called since this portion of the track pad contacts the ground) may further define a first lateral end 216, a second lateral end 218, a front end 220 that is disposed along the track chain traveling direction 210, and a rear end 222 that is disposed along the track chain traveling direction 210. A lateral distance 224 (or "lateral length") of the shoe member 208 may be measured along the lateral direction 212 from the first lateral end 216 to the second lateral end 218, as well as a width 226 that is measured from the front end 220 to the rear end 222 along the track chain traveling direction 210 that is greater than the lateral distance 224.

Figure 4:
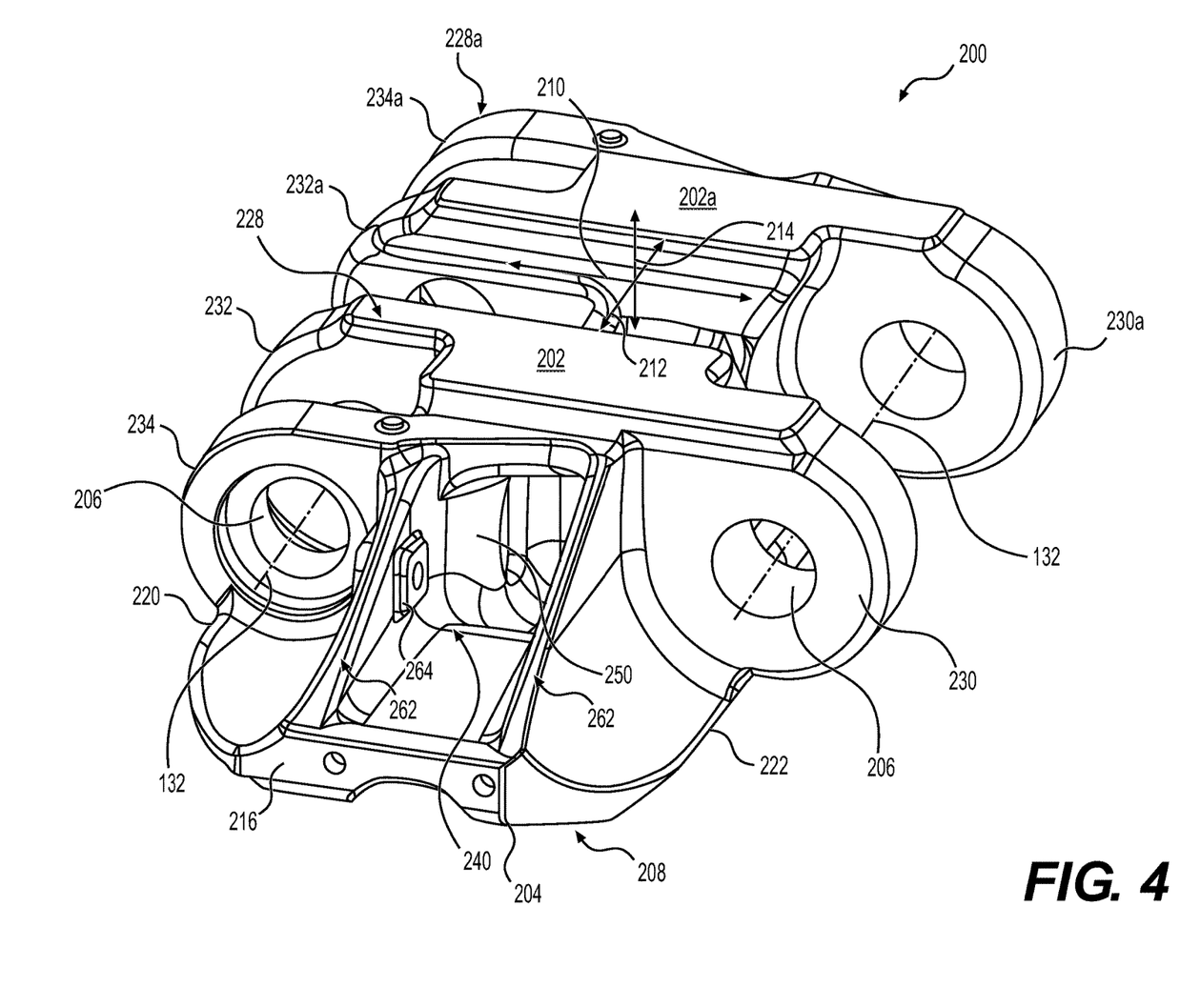
FIG. 4 is a perspective view of a track pad according to an embodiment of the present disclosure that may be employed in FIGS. 1 thru 3.
Figure 8:
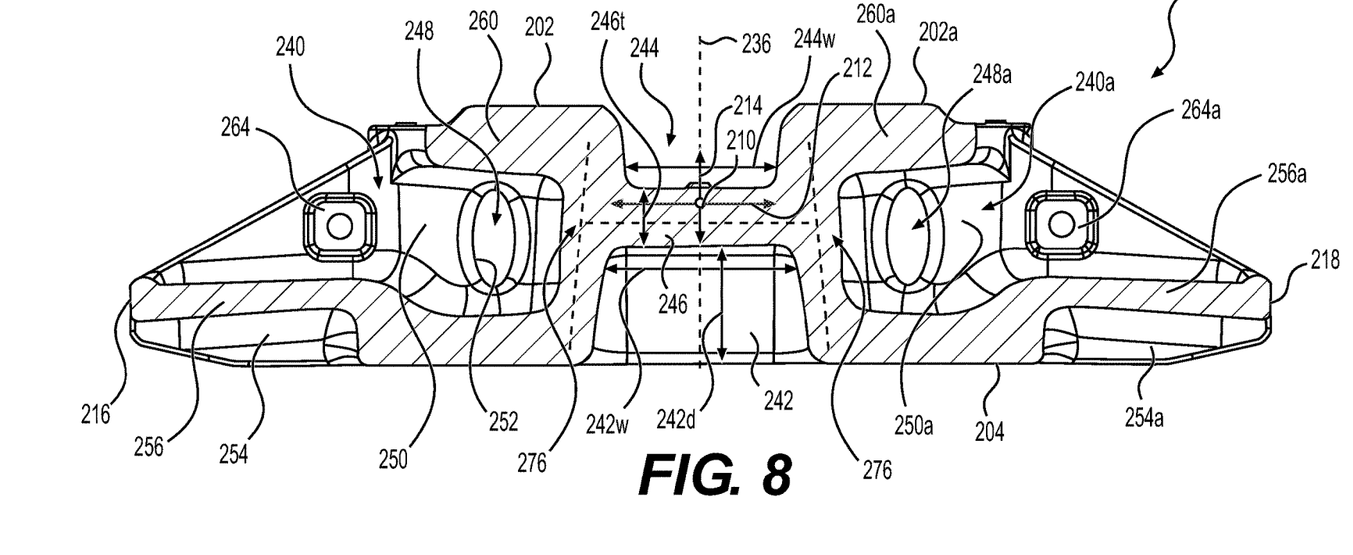
FIG. 8 is a side sectional view of the track pad of FIG. 5 taken along lines 8-8 thereof.

Looking at FIG. 4, a first link member 228 (so called as this portion of the track pad connects to another portion of the track pad) may extend upwardly from the shoe member 208. The first link member 228 may include a first lug member 230 that extends from the first link member 228 in a first direction (e.g. toward the rear) that is parallel to the track chain traveling direction 210, while a second lug member 232 and a third lug member 234 may both extend from the first link member 228 in a second direction (e.g. toward the front) opposite of the first direction. A first side cavity 240 may extend from the first lateral end 216 toward the second lateral end 218 (may terminate shy of the lateral midplane 236 of the track pad 200 as best seen in FIG. 8), jogging (see reference numeral 250) both from the front end 220 toward the rear end 222 along the track chain traveling direction 210 (see FIG. 4), and downwardly toward the ground engaging surface 204 (see FIG. 8). Hence, the first side cavity may be asymmetrical about another midplane 238 disposed along the track chain traveling direction 210 (see FIG. 5).

Similarly, the track pad 200 may comprise a second link member 228a extending upwardly from the shoe member 208. The second link member 228a may include a fourth lug member 230a extending from the second link member 228a along the first direction parallel to the track chain traveling direction 210, a fifth lug member 232a, and a sixth lug member 234a both extending from the second link member 228a in the second direction opposite of the first direction. Also, the track pad defines a second side cavity 240a (see FIG. 5) that extends from the second lateral end 218 toward the first lateral end 216, jogging (see reference numeral 250a) both from the front end 220 toward the rear end 222 along the track chain traveling direction 210, and downwardly toward the ground engaging surface 204. These features may be symmetrical with those of the preceding paragraph about the lateral midplane 236.

Figure 6:
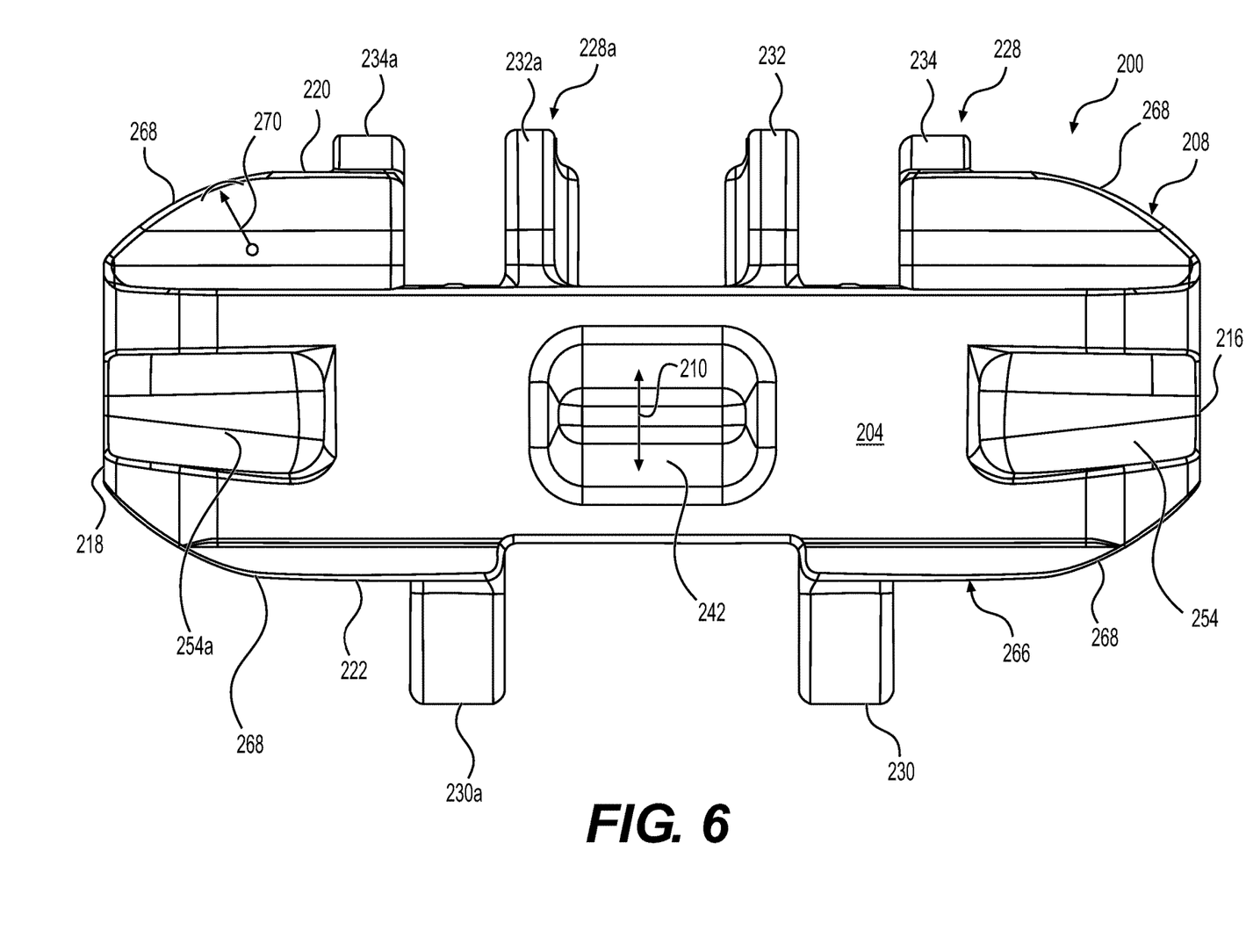
FIG. 6 is a bottom view of the track pad of FIG. 4.

Referring now to FIGS. 6 and 8, the shoe member 208 defines a bottom central void 242 that extends upwardly from the ground engaging surface 204. Near this void 242, the track pad 200 may further define a top central slot 244 (e.g. a thru slot along the track chain traveling direction 210 that allows the guide ridge 134 of the track roller to pass from one track pad to the next unhindered as seen in FIG. 2).

Both the top central slot 244, and the bottom central void 242 may be centered between the first lateral end 216, the second lateral end 218, the first side cavity 240, and the second side cavity 240a, forming a "H" shaped cross-section in a plane (e.g. see the sectioned plane of FIG. 8) that is parallel with the lateral direction 212 and perpendicular to the track chain traveling direction 210.

As best seen in FIG. 8, the top central slot 244, and the bottom central void 242 may be separated from each other by a web 246 defining a web thickness 246t measured along the vertical direction 214 that ranges from 60.0 mm to 80.0 mm (e.g. 70.0 mm), and the bottom central void 242 may define a depth 242d that is measured along the vertical direction 214 that ranges from 140.0 mm to 160.0 mm (e.g. 149.0 mm) in some embodiments. The lateral width of the bottom central void 242 at the bottom of the radii (see 242w) may range from 225.0 mm to 245.0 mm (e.g. 234.2 mm). The top central slot 244 may define another lateral width at the top of its bottom radii (see 244w) that may range from 172.0 mm to 192.0 mm (e.g. 182.6 mm). Any of these dimensions may be altered to be different in other embodiments of the present disclosure.

Figure 7:
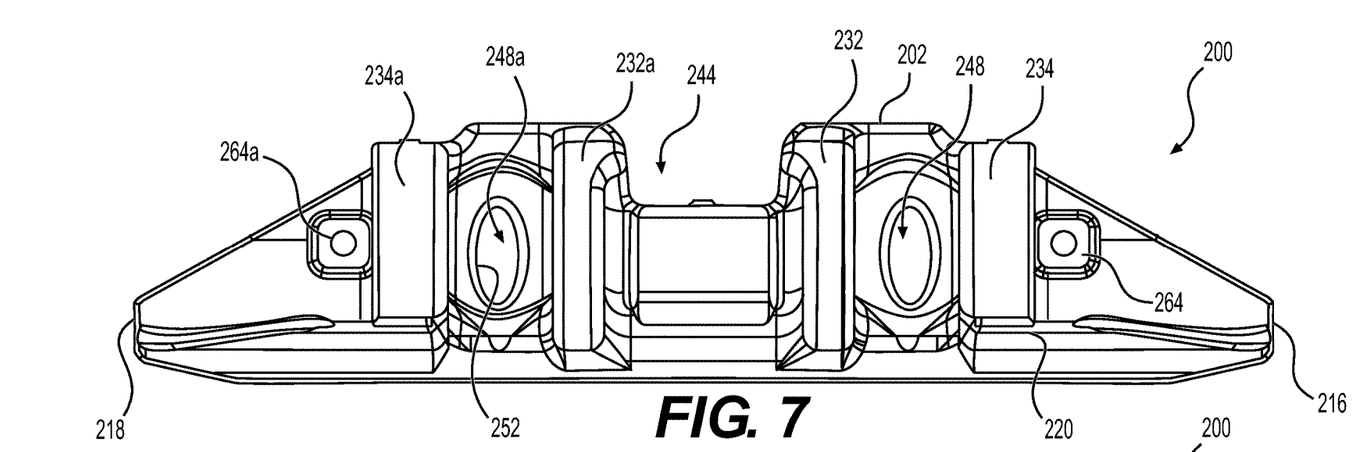
FIG. 7 is a left side view of the track pad of FIG. 4.

Looking at FIGS. 4, 7 and 8, the track pad 200 may further define a first void 248 that is disposed between the second lug member 232, and the third lug member 234. The first void 248 may be disposed proximate vertically, laterally, and along the track chain traveling direction to the jogging (see the location denoted by reference numeral 250) of the first side cavity 240. Likewise, a second void 248a may be disposed between the fifth lug member 232a, and the six lug member 234a. This second void 248a may be disposed proximate vertically, laterally, and along the track chain traveling direction to the jogging (see 250a) of the second side cavity 240a. These features may be symmetrical about the lateral midplane 236 in some embodiments of the present disclosure as shown.

In FIGS. 7 and 8, the first void and the second void define an oval perimeter 252 in a plane that is perpendicular to the track chain traveling direction 210 (e.g. the planes shown in FIGS. 7 and 8). This may core out material, helping to avoid sinks, porosity, etc. during the casting process that may be used to manufacture the track pad. This perimeter may be differently shaped in other embodiments of the present disclosure.

As best seen in FIGS. 6 and 8, the shoe member 208 may further define a first bottom lateral void 254 that extends laterally from the first lateral end 216 underneath the first side cavity 240, forming a first wing 256 therebetween that is drafted along the lateral direction 212. Specifically, the first wing 256 may be angled vertically downwardly to allow a core that forms the first side cavity 240 to be more easily removed during the casting process. In like fashion, a second bottom lateral void 254a may extend from the second lateral end 218 underneath the second side cavity 240a, forming a second wing 256a therebetween that is drafted along the lateral direction 212. These features too may be symmetrical about the lateral midplane 236 in some embodiments of the present disclosure as shown.

A track pad 200 according to another embodiment of the present disclosure will now be discussed.

The track pad may include a shoe member, a first and a second link member, and lug members as previously described herein. Focusing on FIGS. 4 and 8, the first link member 228 and the second link member 228a may both include first and second top rail surfaces 202, 202a respectively. The first side cavity 240 may extend from the first lateral end 216 toward the second lateral end 218 underneath the first top rail surface 202 forming a top wall 260 (see FIG. 8), while the second side cavity 240a may extend from the second lateral end 218 toward the first lateral end 216 underneath the second top rail surface 202a forming a second top wall 260a. The bottom void (e.g. bottom central void 242) may extend upwardly from the ground engaging surface 204, and an upper slot (e.g. top central slot 244) may be disposed vertically above the bottom void, forming an "H" cross-section in a plane that is perpendicular to the track chain traveling direction (e.g. the sectioned plane of FIG. 8).

As alluded to earlier herein, the track pad 200 may define a plane of symmetry (e.g. the lateral midplane 236) that is perpendicular to the lateral direction 212. For the embodiment shown in FIG. 8, the plane of symmetry is disposed half of the lateral distance 224 shown in FIG. 5 from either the first lateral end 216 or the second lateral end 218 (i.e. the lateral midplane 236).

Looking at FIGS. 4 and 5, the first side cavity 240 may be bound by a first pair of ribs 262 that extend laterally and vertically from the first lateral end 216 to the first link member 228, and the second side cavity 240a is bound by a second pair of ribs 262a that extend laterally and vertically from the second lateral end 218 to the second link member 228a. The top edge of these ribs may be angled, extending laterally and vertically.

At least one of the first pair of ribs 262 includes a first bolt receiving pad 264, and at least one of the second pair of ribs 262a includes a second bolt receiving pad 264a. That is to say, either of these bolt receiving pads may define an aperture through which a bolt of the pin retention bolt assembly 130 may pass through to help prevent walking of the pin 128 (see FIG. 3). This feature may be omitted in other embodiments of the present disclosure.

FIGS. 5 and 6 show that the shoe member 208 may include at least a rectangular perimeter 266 in a plane that is perpendicular to the vertical direction 214 (e.g. the top or bottom views of FIGS. 5 and 6) with rounded corners 268 that are not tangential to the first lateral end or the second lateral end. That is to say, these rounded corners may define a radius of curvature 270 that is large enough that they may only be tangential to the front or the rear edge (e.g. see 220 or 222) of the shoe member.

Referring once more to FIGS. 7 and 8, the track pad 200 may further define a first elongated void (e.g. see 248) that is disposed between the second lug member 232 and the third lug member 234. This void may be positioned proximate vertically, laterally, and along the track chain traveling direction to the jogging (see 250) of the first side cavity 240 (see also FIG. 4), and a second elongated void (e.g. see 248a) that is disposed between the fifth lug member 232a and the six lug member 234a. This void may also be positioned proximate vertically, laterally, and along the track chain traveling direction to the jogging (see 250a) of the second side cavity 240a.

The track shoe may be a unitary body as shown or be an assembly of different parts. Often, the shoe member and the first rail member, and the second rail member consist essentially of metallic material such as cast iron, steel, grey cast iron, etc.

Any of the aforementioned features and their associated dimensions may be altered to be different than what has been shown or mentioned herein in other embodiments of the present disclosure.

INDUSTRIAL APPLICABILITY

In practice, a track chain assembly, a track pad or a portion thereof may be sold, manufactured, bought etc. and attached to the machine in the aftermarket or original equipment scenarios according to any of the embodiments discussed herein. That is to say, the machine may be sold with the track chain assembly, track pad and/or portion thereof according to embodiments described herein or the machine may be retrofitted, repaired, refurbished to use any of the embodiments discussed herein. The various components including, but not limited to the track pads, may be used from any suitable material such as cast iron, grey cast iron, steel, etc.

In one particular application, a track pad 200 may include many or possibly all of the features discussed previously herein looking at FIGS. 4 thru 8. Such a track pad 200 may include a shoe member 208, and a first link member 228 extending upwardly from the shoe member 208 including the lug members as previously described herein. The track pad 200 may also define a first side cavity 240 that extends from the first lateral end 216 toward the second lateral end 218 underneath the first top rail surface 202, jogging (e.g. see 250) as previously described.

A first rib and a second rib (e.g. see 262) extend from the first lateral end 216 to the first link member 228, bounding on either lateral side the first side cavity 240. Also, a first blend 272 is provided that transitions from the shoe member 208 to the first rib, and a second blend 274 transitions from the shoe member 208 to the second rib.

As best seen in FIG. 8, the ground engaging surface 204 defines a bottom void (e.g. see 242) that is spaced laterally away from the first side cavity 240 (as well as the upper slot), forming a support column 276 therebetween. This support column 276 may be at least partially disposed underneath the first top rail surface 202 so that weight exerted on the rail surface may be transmitted through the support column 276 under compression to the ground.

The ground engaging surface 204 may further define a first bottom lateral void 254 that extends laterally underneath the first side cavity 240, forming a first wing 256 therebetween that is drafted along the lateral direction 212 to aid in core removal during the casting process.

The track pad 200 further define a first aperture (e.g. see 248 in FIG. 8) that is disposed between the second lug member 232, and the third lug member 234 below the first top rail surface 202, and above the ground engaging surface 204. This aperture may be a thru aperture, and may be disposed proximate vertically, laterally, and along the track chain traveling direction to the jogging (see 250) of the first side cavity 240. Any of these features may be mirrored about a plane of symmetry as previously alluded to herein.

For any of the embodiments discussed herein, the track chain assembly may comprise a plurality of track chain members (e.g. track pads) that are similarly or identically configured. It is to be understood that at least one or two additional track chain members may be also provided that have different or dissimilar geometry as may be the case for two master links that are joined to the plurality of similar or identically configured track chain members, etc.

As can be seen, various embodiments of the track pad disclosed herein may provide a less costly track pad that is easier to manufacture, less prone to manufacturing problems, and that still is able to support heavy loads in use.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track pad comprising:
   a shoe member including a ground engaging surface, and defining a track chain traveling direction, a lateral direction perpendicular to the track chain traveling direction, and a vertical direction perpendicular to both the lateral direction, and the track chain traveling direction, the shoe member further defining a first lateral end, a second lateral end, a front end along the track chain traveling direction, and a rear end along the track chain traveling direction, a lateral distance from the first lateral end to the second lateral end, and a width from the front end to the rear end along the track chain traveling direction that is greater than the lateral distance; and
   a first link member extending upwardly from the shoe member including
      a first lug member extending from the first link member in a first direction parallel to the track chain traveling direction, a second lug member and a third lug member both extending from the first link member in a second direction opposite of the first direction;
   wherein the track pad defines a first side cavity that extends from the first lateral end toward the second lateral end, the first side cavity being asymmetrical about a midplane of the track pad extending from the first lateral end to the second lateral end, the first side cavity jogging
      increasingly from the front end toward the rear end along the track chain traveling direction, and
      downwardly from the first lateral end toward the ground engaging surface.

2. The track pad of claim 1, further comprising:
   a second link member extending upwardly from the shoe member including
      a fourth lug member extending from the second link member along the first direction parallel to the track chain traveling direction, a fifth lug member and a sixth lug member both extending from the second link member in the second direction opposite of the first direction,
   wherein the track pad defines a second side cavity that extends from the second lateral end toward the first lateral end, the second side cavity being asymmetrical about the midplane of the track pad, the second side cavity jogging
      increasingly from the front end toward the rear end along the track chain traveling direction, and
      downwardly from the second lateral end toward the ground engaging surface.

3. The track pad of claim 2, wherein the shoe member defines a bottom central void that extends upwardly from the ground engaging surface, and the track pad further defines a top central slot, and the top central slot and the bottom central void are centered between the first lateral end, the second lateral end, the first side cavity, and the second side cavity, forming an "H" shaped cross-section in a plane that is parallel with the lateral direction and perpendicular to the track chain traveling direction.

4. The track pad of claim 3, wherein the top central slot and the bottom central void are separated from each other by a web, the web having a web thickness measured along the vertical direction that ranges from 60.0 mm to 80.0 mm, and the bottom central void having a depth measured along the vertical direction that ranges from 140.0 mm to 160.0 mm.

5. The track pad of claim 2, wherein the track pad further defines a first void that is disposed between the second lug member and the third lug member, proximate vertically, laterally, and along the track chain traveling direction to the jogging of the first side cavity.

6. The track pad of claim 5, wherein the track pad further defines a second void that is disposed between the fifth lug member and the six lug member, proximate vertically, laterally, and along the track chain traveling direction to the jogging of the second side cavity.

7. The track pad of claim 6, wherein the first void and the second void define an oval perimeter in a plane that is perpendicular to the track chain traveling direction.

8. The track pad of claim 3, wherein the shoe member further defines a first bottom lateral void that extends from the first lateral end underneath the first side cavity, forming a first wing therebetween that is drafted along the lateral direction, and a second bottom lateral void that extends from the second lateral end underneath the second side cavity, forming a second wing therebetween that is drafted along the lateral direction, the first bottom lateral void and the second bottom lateral void being asymmetrical about the midplane of the track pad.

9. A track pad comprising:
   a shoe member including a ground engaging surface, and defining a track chain traveling direction, a lateral direction perpendicular to the track chain traveling direction, and a vertical direction perpendicular to both the lateral direction, and the track chain traveling direction, the shoe member further defining a first lateral end, a second lateral end, a front end along the track chain traveling direction, and a rear end along the track chain traveling direction, a lateral distance from the first lateral end to the second lateral end, and a length from the front end to the rear end along the track chain traveling direction that is greater than the lateral distance;
   a first link member extending upwardly from the shoe member including:
      a first top rail surface,
      a first lug member extending from the first link member in a first direction parallel to the track chain traveling direction, and
      a second lug member and a third lug member both extending from the first link member in a second direction opposite of the first direction; and
   a second link member extending upwardly from the shoe member including:
      a second top rail surface,
      a fourth lug member extending from the second link member along the first direction parallel to the track chain traveling direction, and
      a fifth lug member and a sixth lug member both extending from the second link member in the second direction opposite of the first direction,
   wherein the track pad defines:
      a first side cavity that extends from the first lateral end toward the second lateral end underneath the first top rail surface, the first side cavity being asymmetrical about a midplane of the track pad extending from the first lateral end to the second lateral end, the first side cavity jogging
         increasingly from the front end toward the rear end along the track chain traveling direction, and
         downwardly from the first lateral end toward the ground engaging surface, a second side cavity that extends from the second lateral end toward the first lateral end underneath the second top rail surface, a bottom void that extends upwardly from the ground engaging surface, and an upper slot disposed vertically above the bottom void, forming an "H" cross-section in a plane that is perpendicular to the track chain traveling direction.

10. The track pad of claim 9, wherein the second side cavity is asymmetrical about the midplane of the track pad, the second side cavity jogs increasingly from the front end toward the rear end along the track chain traveling direction, and downwardly from the second lateral end toward the ground engaging surface.

11. The track pad of claim 10, wherein the track pad includes a web that is disposed vertically between the upper slot and the bottom void, the web having a web thickness measured vertically ranging from 60.0 mm to 80.0 mm, and the bottom void having a depth measured vertically ranging from 140.0 mm to 160.0 mm and being symmetric about the midplane and a lateral midplane of the track pad.

12. The track pad of claim 10, wherein the track pad defines a plane of symmetry that is perpendicular to the lateral direction.

13. The track pad of claim 12, wherein the plane of symmetry is disposed half of the lateral distance from either the first lateral end or the second lateral end.

14. The track pad of claim 10, wherein the first side cavity is bound by a first pair of ribs that extend laterally and vertically from the first lateral end to the first link member, and the second side cavity is bound by a second pair of ribs that extend laterally and vertically from the second lateral end to the second link member.

15. The track pad of claim 14, wherein at least one of the first pair of ribs includes a first bolt receiving pad, and at least one of the second pair of ribs includes a second bolt receiving pad.

16. The track pad of claim 9, wherein the shoe member includes a rectangular perimeter in a plane that is perpendicular to the vertical direction with rounded corners.

17. The track pad of claim 16, wherein the rounded corners are not tangential to either the first lateral end or the second lateral end.

18. The track pad of claim 10, wherein the track pad further defines a first elongated void that is disposed between the second lug member and the third lug member, proximate vertically, laterally, and along the track chain traveling direction to the jogging of the first side cavity, and a second elongated void that is disposed between the fifth lug member and the six lug member, proximate vertically, laterally, and along the track chain traveling direction to the jogging of the second side cavity.

19. The track pad of claim 18, wherein the shoe member further defines a first bottom lateral void that extends from the first lateral end underneath the first side cavity, forming a first wing therebetween that is drafted along the lateral direction, and a second bottom lateral void that extends from the second lateral end underneath a second side void, forming a second wing therebetween that is drafted along the lateral direction.

20. A track pad comprising:

a shoe member including a ground engaging surface, and defining a track chain traveling direction, a lateral direction perpendicular to the track chain traveling direction, and a vertical direction perpendicular to both the lateral direction, and the track chain traveling direction, the shoe member further defining a first lateral end, a second lateral end, a front end along the track chain traveling direction, and a rear end along the track chain traveling direction, a lateral distance from the first lateral end to the second lateral end, and a length from the front end to the rear end along the track chain traveling direction that is greater than the lateral distance;

a first link member extending upwardly from the shoe member including:

a first lug member extending from the first link member in a first direction parallel to the track chain traveling direction, and a second lug member and a third lug member both extending from the first link member in a second direction opposite of the first direction, the first lug member and the second lug member defining a first top rail surface;

wherein:

the track pad defines a first side cavity that extends from the first lateral end toward the second lateral end underneath the first top rail surface, the first side cavity being asymmetrical about the midplane of the track pad extending from the first lateral end to the second lateral end, the first side cavity jogging both increasingly from the front end toward the rear end along the track chain traveling direction, and downwardly from the first lateral end toward the ground engaging surface, a first rib and a second rib extend from the first lateral end to the first link member bounding on either side the first side cavity, a first blend transitions from the shoe member to the first rib, and a second blend transitions from the shoe member to the second rib, the ground engaging surface defines:

a bottom void that is spaced laterally away from the first side cavity, forming a support column therebetween and at least partially underneath the first top rail surface, and a first bottom lateral void that extends laterally underneath the first side cavity, forming a first wing therebetween that is drafted along the lateral direction, and the track pad further defines a first void that is disposed between the second lug member and the third lug member below the first top rail surface and above the ground engaging surface, and proximate vertically, laterally, and along the track chain traveling direction to the jogging of the first side cavity.

* * * * *